(12) United States Patent
Belvo

(10) Patent No.: US 6,466,857 B1
(45) Date of Patent: Oct. 15, 2002

(54) DRIVE WHEEL TRACTION CONTROL DURING VEHICLE STABILITY ENHANCEMENT EVENTS

(75) Inventor: Todd A. Belvo, White Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/007,648

(22) Filed: Dec. 5, 2001

(51) Int. Cl.[7] ............................................... G06F 17/00
(52) U.S. Cl. ........................... 701/82; 701/70; 701/72; 701/79; 303/140; 303/143; 180/197
(58) Field of Search ............................. 701/70, 71, 72, 701/74, 78, 83, 88, 89, 79; 303/140, 143, 146; 180/197

(56) References Cited

U.S. PATENT DOCUMENTS

| | | | |
|---|---|---|---|
| 5,720,533 A | * | 2/1998 | Pastor et al. ............... 303/140 |
| 5,746,486 A | * | 5/1998 | Paul et al. ................... 303/146 |
| 6,212,460 B1 | * | 4/2001 | Rizzo et al. ................. 701/70 |

* cited by examiner

Primary Examiner—Gertrude Arthur
(74) Attorney, Agent, or Firm—Robert M. Sigler

(57) ABSTRACT

A traction control for a motor vehicle derives a target delta velocity as the sum of a longitudinal velocity of the vehicle and a target delta velocity derived from one or more of a longitudinal acceleration, a lateral acceleration and a turn curvature. The vehicle has a vehicle stability enhancement system of the type becoming active when a vehicle yaw rate error is sensed for providing braking control of individual wheels of the motor vehicle to reduce the vehicle yaw rate error below a predetermined value. In response to activity of the vehicle stability enhancement system in reducing a vehicle yaw rate error, the target delta velocity, and thus the target velocity, is bounding between a maximum target velocity value and a minimum target velocity value, at least one of which is derived from an estimated coefficient of friction between the vehicle drive wheels and the drive surface. The choice of which of the upper and lower bounds is to be so limited depends on whether the drive wheels are front wheels or rear wheels and whether the vehicle is in understeer or oversteer.

18 Claims, 3 Drawing Sheets

DRIVE WHEEL TRACTION CONTROL DURING VEHICLE STABILITY ENHANCEMENT EVENTS

TECHNICAL FIELD

The technical field of this invention is vehicle traction control.

BACKGROUND OF THE INVENTION

A known traction control for a motor vehicle calculates a target velocity for a slipping drive wheel relative to a reference speed of the vehicle and applies an individual braking command to the wheel and/or decreases engine power to bring the speed of the slipping wheel toward the target velocity. The target velocity is derived as the sum of the vehicle reference speed and a target delta velocity, the size of which controls the desired amount of wheel slip. The target velocity is derived in a manner to optimize vehicle acceleration, stability and steerability. It is calculated as a function of longitudinal acceleration and vehicle speed, lateral acceleration and turn curvature, with the contribution of each of these parameters optimized for a specific vehicle application. The target delta velocity is then bounded between maximum and minimum values that define an optimal range of target delta velocities to optimize vehicle performance for a variety of surfaces and vehicle operating conditions.

During evasive or performance driving on low or medium coefficient of friction surfaces, a vehicle stability enhancement (VSE) system may be activated to improve driver control. The VSE system applies the vehicle brakes or some other wheel slip affecting system in response to a detected error between a measured vehicle yaw rate and a desired yaw rate calculated from vehicle handling parameters such as vehicle speed and steering angle.

SUMMARY OF THE INVENTION

The method and apparatus of this invention provides traction control for the drive wheels of a motor vehicle that supplements the action of a vehicle stability enhancement system during vehicle stability enhancement events by increasing and/or decreasing slip of individual vehicle drive wheels to complement the braking or similar action of the VSE system.

The method and apparatus of this invention provides traction control of the drive wheels of a motor vehicle by deriving a target velocity from a vehicle longitudinal speed and one or more of a vehicle longitudinal acceleration, a vehicle lateral velocity and a vehicle turn curvature, estimating a coefficient of friction between the vehicle wheels and the drive surface, and, responsive to activity of the vehicle. stability enhancement system in reducing a vehicle yaw rate error, bounding the target velocity between a maximum target velocity value and a minimum target velocity value, with at least one of the maximum target velocity value and the minimum target velocity value being derived from the estimated coefficient of friction. Preferably, the one of the maximum target velocity value and minimum target velocity value that is derived from the estimated coefficient of friction is greater at a high magnitude of the estimated coefficient of friction than at a low magnitude of the estimated coefficient of friction. In a preferred embodiment, the understeer/oversteer behavior of the vehicle is derived, for example by the vehicle stability enhancement system. Preferably, if the drive wheels are front wheels of the vehicle, the maximum target velocity value is derived from the estimated coefficient of friction when the vehicle is in understeer and the minimum target velocity value is derived from the estimated coefficient of friction when the vehicle is in oversteer. Preferably, if the drive wheels are the rear wheels of the vehicle, the maximum target velocity value is derived from the estimated coefficient of friction when the vehicle is in oversteer and the minimum target velocity value is derived from the estimated coefficient of friction when the vehicle is in understeer.

DESCRIPTION OF THE PREFERRED EMBODIMENT

Figure 1:
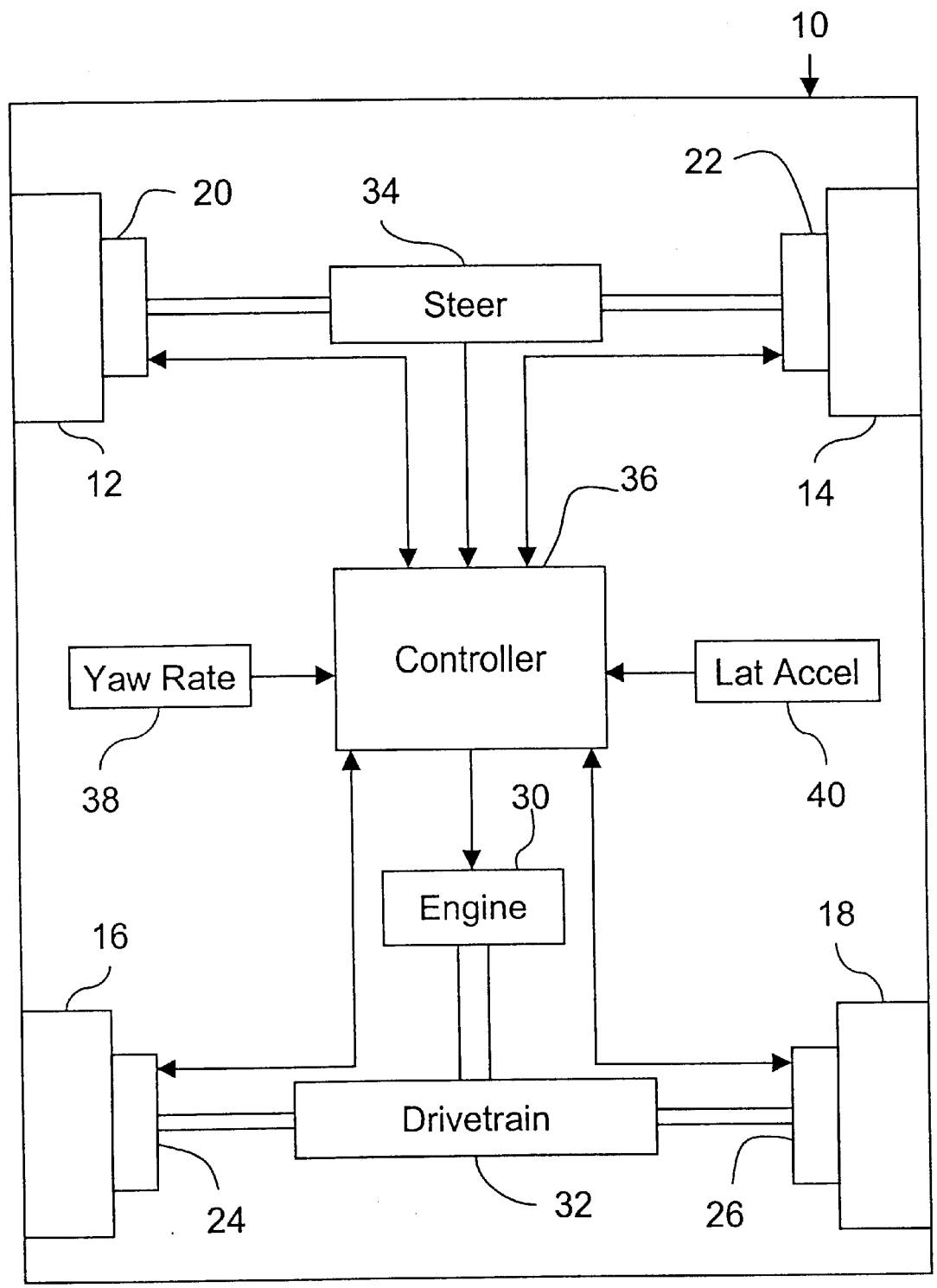
FIG. 1 shows a schematic diagram of a motor vehicle having a vehicle traction control according to this invention.

FIG. 1 shows a schematic diagram of a vehicle having a traction control in accordance with the present invention. Vehicle 10 typically includes a front pair of wheels 12, 14 and a rear pair of wheels 16, 18. At least one of these pairs of wheels is driven by a propulsion engine 30 through a suitable drivetrain 32. In this embodiment, the rear pair of wheels 16, 18 is shown as driven; but one could choose the front pair of wheels or all the wheels. At least one of the pair of wheels is steerable via a steering wheel, not shown, through a steer apparatus 34. Typically, the front pair of wheels 12, 14 is steerable, but the rear pair of wheels could also be steerable. Steer apparatus 34 incorporates a steer angle sensor of standard construction, not separately shown. All four wheels 12, 14, 16, 18 are provided with brake units: 20, 22, 24, 26, respectively. Brake units 20–26 may be activated, for example by hydraulic pressure, together in response to a driver actuated brake apply system, not shown. Together with its respective wheel, each of brake units 20–26 includes a wheel speed sensor of standard construction, not separately shown, that provides an electronic wheel speed signal; and vehicle longitudinal speed may be calculated from these wheel speed signals in a known manner. Additional sensors on vehicle 10 include a yaw rate sensor 38 and a lateral acceleration sensor 40.

Brake units 20–26 are each provided with actuator apparatus capable of separately controlling the brake pressure applied in that brake unit independently of the other brake units and of the overall master cylinder pressure, if such pressure is provided. In one embodiment, brake actuators in brake units 20–26 are implemented as reciprocating piston actuators of a type known to those skilled in the art. Such actuators typically include a direct current (DC) motor which controls the position of a reciprocating piston through a rotary-to-linear motion converter to increase and/or decrease the hydraulic pressure in the brakes. In another embodiment, the brake actuators are implemented as solenoid valves for selectively coupling the brakes to a source of pressurized hydraulic fluid to increase brake pressure. Additionally, in this embodiment, the solenoid valves are used for selectively coupling brake units 20, 22, 24, 26 to a brake fluid reservoir to decrease brake pressure. Implementation of such solenoid valves is known to those skilled in the art. In yet another example, rear brake units 24, 26 and/or front brake units 20, 22 may be electric motor-driven, in which case the actuator and brake functions are performed by the same unit.

A controller 36 receives the wheel speed signals from the wheel speed sensors incorporated in wheels 12, 14, 16, 18 and brake units 20, 22, 24, 26, the steer angle signal from steer apparatus 34, the yaw rate signal from yaw rate sensor 38 and the lateral acceleration signal from a lateral accelerometer 40. Controller 36 comprises one or more programmed digital microcomputers that are shown as a single computer in this embodiment for convenience. Controller 36 typically includes a microprocessor, ROM, RAM and appropriate input and output circuits of a known type for receiving the various input signals and for outputting the various control commands to the actuators of brake units 20–26 and the engine 30 or drivetrain 32. The operation of controller 36 is controlled by a stored program, which may be considered as divided into a brake control sub-program, and an engine control sub-program, with a vehicle stability enhancement control routine providing an input signal to the brake control sub-program and a vehicle traction control routine providing inputs to both the brake and engine sub-programs, although both these routines may most conveniently be packaged in the brake control sub-program. Alternatively, the functions of controller 36 could be performed in separate brake and engine control computers with means for mutual communication or in any other organizational combination that is useful and convenient.

Responsive to the various inputs, controller 36 controls the braking of each wheel 12, 14, 16, 18, as well as the applied power of engine 30, in traction control mode during certain vehicle acceleration maneuvers to maintain the tractive force of the drive wheels on the drive surface. The acceleration traction control is performed in a known manner, except as modified herein. In this known manner, controller 36 monitors the wheel speeds sensed by the wheel speed sensors to determine if the driven wheels, which are intended to transfer motive force to the drive surface, are slipping or are about to slip. A vehicle reference (longitudinal) speed is calculated from selected (generally non-driven) wheel speeds; and a target delta velocity is determined for a slipping wheel on the basis of vehicle operating conditions to define a desired level of wheel slip and summed with the vehicle reference speed to provide a target velocity for the wheel: The brake associated with the slipping wheel is applied to reduce the error or difference between the measured wheel speed and the target velocity for the wheel. Such control is often, but not necessarily, performed in conjunction with a parallel control of the engine or motor (and/or the transmission) to temporarily reduce the motive force output until wheel-to-road traction is reestablished. Many examples of such controls are known in the art, for example in patents such as U.S. Pat. No. 5,720,533, issued Feb. 28, 1998, and in commercially produced vehicles.

Controller 36 also actively controls wheel brake units 20, 22, 24, 26 in a vehicle stability enhancement mode. In vehicle stability enhancement, the example system described herein performs an active brake control of two wheel brake units 20, 22 or of four wheel brake units 20, 22, 24, 26 responsive to the steer angle signal, the yaw rate signal from sensor 38, the vehicle speed as calculated responsive to selected ones of the four wheel speed signals and the lateral acceleration signal from sensor 40. Using these signals, controller 36 then determines a desired vehicle yaw rate, typically from the vehicle speed and steer angle, and compares it to the actual yaw rate sensed by the yaw rate sensor 38. Controller 36 may also determine a desired vehicle slip angle and compare it to the actual vehicle slip angle as determined by an estimator observer in the controller. If the yaw rate of vehicle 10 differs from the desired yaw rate by more than a dynamically determined yaw rate threshold, controller 36 then determines and outputs commands to selected brake actuators of brake units 20–26. This may also occur if a desired corrective yaw moment (determined responsive to yaw rate error and slip angle error) is greater than a yaw moment threshold. The purpose of the control is to bring the vehicle yaw rate and slip angle into conformance with the desired yaw rate and slip angle. In a two-channel system, only the front brake units 20, 22 are controlled. A number of such yaw rate control systems are known in the art; and example is shown in U.S. Pat. No. 6,035,251, issued Mar. 7, 2000.

Figure 2:
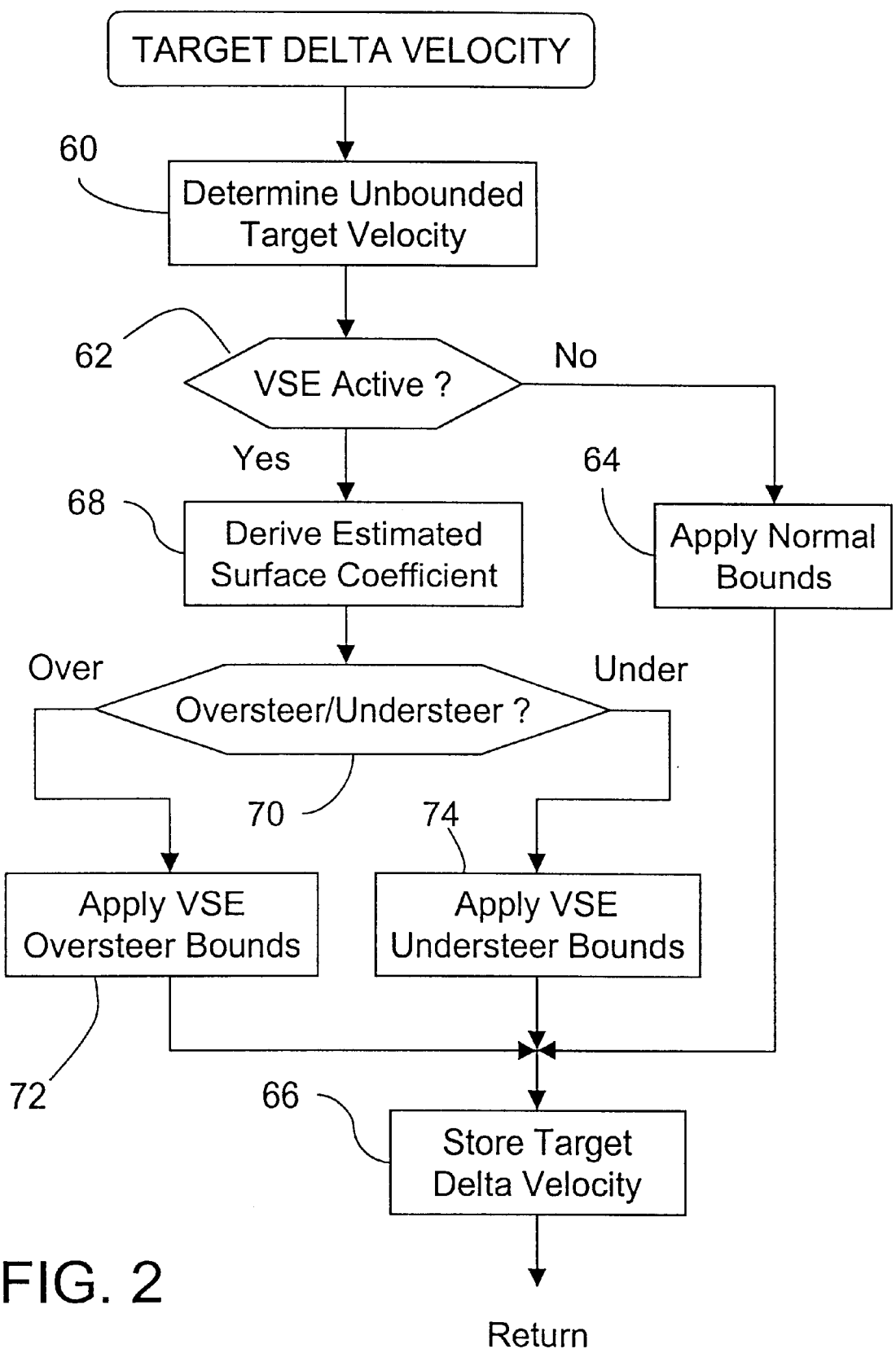
FIG. 2 shows a flow chart illustrating the operation of this invention in the vehicle traction control of FIG. 1.

The specific addition to the prior art that distinguishes the apparatus and method of this invention will be described with reference to the flow chart of FIG. 2, which shows a computer flow chart of a subroutine named TARGET DELTA VELOCITY, in which the Target Delta Velocity for a slipping wheel. In step 60, an unbounded value of the Target Delta Velocity for a slipping wheel is determined on the basis of, for example, vehicle reference (longitudinal) velocity, vehicle longitudinal acceleration, vehicle lateral acceleration and vehicle turn curvature. The vehicle reference velocity may be determined from the sensed wheel speeds in a manner known in the art for determining vehicle longitudinal velocity, for example by averaging the measured wheel speeds of the undriven wheels. In this embodiment, the Target Delta Velocity increases as the vehicle reference velocity increases. The vehicle longitudinal acceleration may be determined by differentiating the vehicle longitudinal velocity. An approximate value may be determined in a digital system by setting the vehicle longitudinal acceleration equal to the difference between two consecutive values of the vehicle longitudinal velocity or from a longitudinal accelerometer. In this embodiment, the Target Delta Velocity increases as vehicle longitudinal acceleration increases. The vehicle lateral acceleration is derived from the output signal of lateral acceleration sensor 40; and the turn curvature is derived from the steering angle signal output by a sensor in the steer apparatus 34. In this embodiment, the target velocity increases when lateral acceleration increases as turn curvature increases but decreases when turn curvature increases as lateral acceleration remains small.

Next, at step 62, the subroutine determines if the vehicle stability enhancement (VSE) system is active—that is, if it is actively controlling a vehicle chassis system such as the braking system. If it is not, the subroutine proceeds to step 64, in which the unbounded value of Target Delta Velocity derived in step 60 is limited, if required, to upper and lower normal bounds—that is, if the unbounded value exceeds the normal upper bound value it is replaced thereby and if it is exceeded by the normal lower bound value it is replaced thereby. The subroutine then stores the bounded value of Target Delta Velocity before it returns program control to the routine from which it was called.

From step 62, if the VSE system is active, the subroutine proceeds to step 68, wherein another subroutine is called to provide an estimated surface coefficient between the vehicle's tires and the drive surface. The surface coefficient may be determined in any manner known in the art that will provide a sufficiently accurate value. For example, a method of estimating the surface coefficient of friction for a vehicle is described in the U.S. Pat. No. 6,035,251, already cited. A more robust method, which may provide greater accuracy, is described in U.S. Ser. No. 09/769,676, filed Jan. 25, 2001 and assigned to the assignee of this application. The disclosure of that application is included by reference herein. From step 70, the subroutine determines whether the vehicle is in an oversteer mode or an understeer mode of operation. This information is usually available from the VSE system. If the vehicle is in oversteer, the subroutine applies upper and lower VSE oversteer bounds at step 72 and proceeds to step 66 wherein the bounded Target Delta Velocity is stored. If the vehicle is in understeer, the subroutine applies upper and lower VSE understeer bounds at step 74 and proceeds to step 66 wherein the bounded target velocity is stored.

The VSE oversteer and understeer bounds are, in general, different from the normal bounds; and, rather than being constant values, they may be functions of the estimated surface coefficient. In addition, they vary depending on whether the drive (powered) wheels are front wheels or rear wheels of the vehicle. The following are examples of the VSE oversteer and understeer bounds as functions or estimated surface coefficient.

In the case of rear wheel drive, during understeer, the Target Delta Velocity is increased from the normal value so that the driven (rear) wheels are allowed to obtain a wheel speed that allows a greater than normal wheel slip. The lateral capability of the rear wheels is reduced, and the vehicle may turn in more. The lower VSE understeer bound increases with surface coefficient while the upper VSE understeer bound does not vary with surface coefficient; and understeer is reduced. But during oversteer, the Target Delta Velocity is reduced from the normal value so that the driven (rear) wheels of the vehicle are controlled to a wheel speed very close to the reference speed of the vehicle. This maximizes the lateral capability of the rear wheels and optimizes vehicle stability. The upper VSE oversteer bound thus increases with surface coefficient while the lower VSE oversteer bound does not vary with surface coefficient; and oversteer is reduced.

Figure 3:
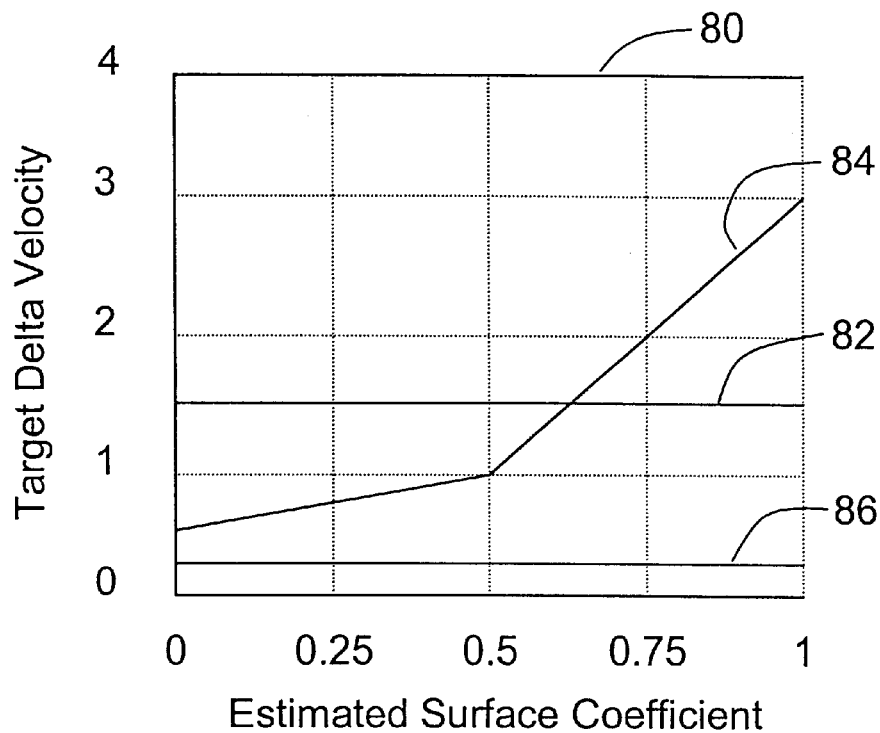
FIGS. 3 and 4 are graphical plots of target delta velocity as a function of surface coefficient of adhesion for specific examples of the invention.

An example for a rear wheel drive vehicle in oversteer is shown in FIG. 3, which shows a graphical plot with a horizontal axis of estimated surface coefficient of adhesion (friction) and a vertical axis of Target Delta Velocity. Curves 80 and 82 show the normal upper (4 kph) and lower (1.5 kph) bounds, respectively, for the Target Delta Velocity that are used in the absence of a VSE event. Curves 84 and 86 show the VSE upper and lower (0.25 kph) bounds, respectively, for the Target Delta Velocity that are used during a VSE event. The upper VSE bound increases from a value of 0.5 at surface coefficient=0 to a value of 3 at surface coefficient=1.

In the case of front wheel drive, during understeer, the Target Delta Velocity is reduced from the normal value so that the driven (front) wheels of the vehicle are controlled to a wheel speed very close to the reference speed of the vehicle. This maximizes the lateral capability of the front wheels and optimizes vehicle steerability. The upper VSE understeer bound increases with surface coefficient while the lower VSE understeer bound does not vary with surface coefficient; and understeer is reduced. But during oversteer, the Target Delta Velocity is increased from the normal value so that the driven (front) wheels are allowed to obtain a wheel speed that allows a greater than normal wheel slip. The lateral capability of the front wheels is reduced, and the vehicle is prevented from turning excessively. The lower VSE oversteer bound increases with surface coefficient while the upper VSE oversteer bound does not vary with surface coefficient; and oversteer is reduced.

Figure 4:
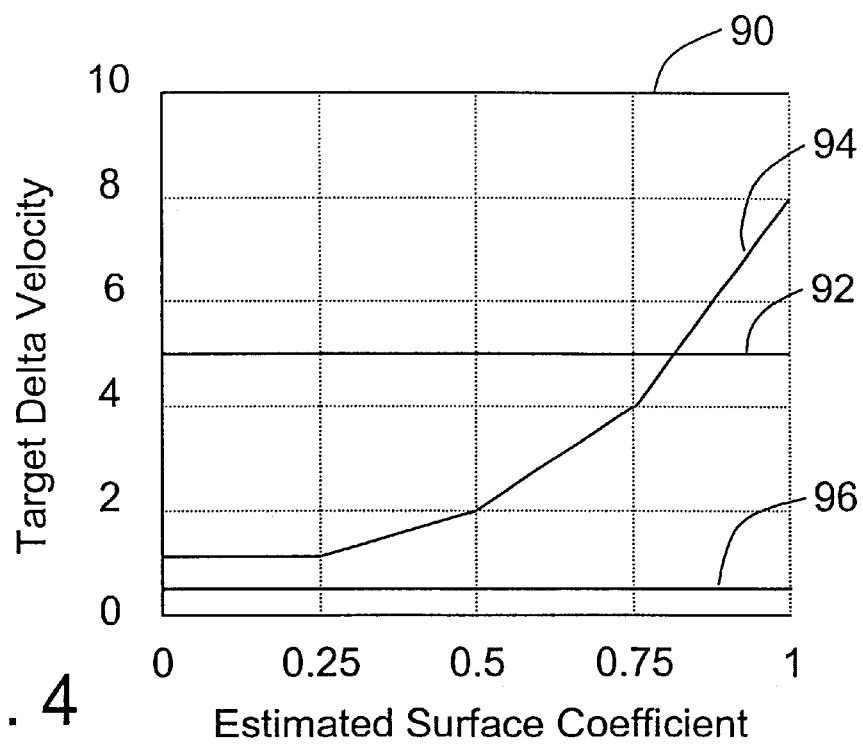

An example for a front wheel drive vehicle in understeer is shown in FIG. 4, which shows a graphical plot with a horizontal axis of estimated surface coefficient of adhesion (friction) and a vertical axis of Target Delta Velocity. Curves 90 and 92 show the normal upper (10 kph) and lower (5 kph) bounds, respectively, for the Target Delta Velocity that are used in the absence of a VSE event. Curves 94 and 96 show the VSE upper and lower (0.5 kph) bounds, respectively, for the Target Delta Velocity that are used during a VSE event. The upper VSE bound increases from a value of 1 at surface coefficient=0 to a value of 8 at surface coefficient=1.

The method and apparatus are also applicable to all wheel drive vehicles. When both front and rear wheels are driven, the front axle will be treated as in the front drive case described above; and the rear axle will be treated as in the rear drive case described above.

What is claimed is:

1. A method for controlling the traction on a drive surface of drive wheels of a motor vehicle having a vehicle stability enhancement system of the type becoming active when a vehicle yaw rate error is sensed for providing braking control of individual wheels of the motor vehicle to reduce the vehicle yaw rate error below a predetermined value, the method comprising the steps:

deriving a target velocity from a vehicle longitudinal speed and one or more of a vehicle longitudinal acceleration, a vehicle lateral velocity and a vehicle turn curvature;

estimating a coefficient of friction between the vehicle wheels and the drive surface; and responsive to activity of the vehicle stability enhancement system in reducing a vehicle yaw rate error, bounding the target velocity between a maximum target velocity value and a minimum target velocity value, at least one of the maximum target velocity value and the minimum target velocity value being derived from the estimated coefficient of friction.

2. The method of claim 1 wherein the one of the maximum target velocity value and minimum target velocity value that is derived from the estimated coefficient of friction is greater at a high magnitude of the estimated coefficient of friction than at a low magnitude of the estimated coefficient of friction.

3. The method of claim 1 wherein the drive wheels are front wheels of the vehicle, the method further comprises the step of determining an understeer/oversteer behavior of the vehicle, and the step of bounding the target velocity comprises deriving the maximum target velocity value from the estimated coefficient of friction when the vehicle is in understeer and deriving the minimum target velocity value from the estimated coefficient of friction when the vehicle is in oversteer.

4. The method of claim 3 wherein the one of the maximum target velocity value and minimum target velocity value that is derived from the estimated coefficient of friction is greater at a high magnitude of the estimated coefficient of friction than at a low magnitude of the estimated coefficient of friction.

5. The method of claim 1 wherein the drive wheels are rear wheels of the vehicle, the method further comprises the step of determining an understeer/oversteer behavior of the vehicle, and the step of bounding the target velocity comprises deriving the maximum target velocity value from the estimated coefficient of friction when the vehicle is in oversteer and deriving the minimum target velocity value from the estimated coefficient of friction when the vehicle is in understeer.

6. The method of claim 5 wherein the one of the maximum target velocity value and minimum target velocity value that is derived from the estimated coefficient of friction is greater at a high magnitude of the estimated coefficient of friction than at a low magnitude of the estimated coefficient of friction.

7. The method of claim 1 wherein the target velocity comprises a sum of the vehicle longitudinal velocity and a target delta velocity derived from the one or more of a vehicle longitudinal acceleration, a vehicle lateral velocity and a vehicle turn curvature and the step of bounding the target velocity between a maximum target velocity value and a minimum target velocity value comprises bounding the target delta velocity between a maximum target delta velocity value and a minimum target delta velocity value, at least one of the maximum target delta velocity value and the minimum target delta velocity value being derived from the estimated coefficient of friction.

8. The method of claim 7 wherein the one of the maximum target delta velocity value and minimum target delta velocity value that is derived from the estimated coefficient of friction is greater at a high magnitude of the estimated coefficient of friction than at a low magnitude of the estimated coefficient of friction.

9. The method of claim 7 wherein the drive wheels are front wheels of the vehicle, the method further comprises the step of determining an understeer/oversteer behavior of the vehicle, and the step of bounding the target delta velocity comprises deriving the maximum target delta velocity value from the estimated coefficient of friction when the vehicle is in understeer and deriving the minimum target delta velocity value from the estimated coefficient of friction when the vehicle is in oversteer.

10. The method of claim 9 wherein the one of the maximum target delta velocity value and minimum target delta velocity value that is derived from the estimated coefficient of friction is greater at a high magnitude of the estimated coefficient of friction than at a low magnitude of the estimated coefficient of friction.

11. The method of claim 7 wherein the drive wheels are rear wheels of the vehicle, the method further comprises the step of determining an understeer/oversteer behavior of the vehicle, and the step of bounding the target delta velocity comprises deriving the maximum target delta velocity value from the estimated coefficient of friction when the vehicle is in oversteer and deriving the minimum target delta velocity value from the estimated coefficient of friction when the vehicle is in understeer.

12. The method of claim 11 wherein the one of the maximum target delta velocity value and minimum target delta velocity value that is derived from the estimated coefficient of friction is greater at a high magnitude of the estimated coefficient of friction than at a low magnitude of the estimated coefficient of friction.

13. A traction control for a motor vehicle having drive wheels and a vehicle stability enhancement system of the type becoming active when a vehicle yaw rate error is sensed for providing braking control of individual wheels of the motor vehicle to reduce the vehicle yaw rate error below a predetermined value, the traction control comprising:

means for deriving a target velocity from a vehicle longitudinal speed and one or more of a vehicle longitudinal acceleration, a vehicle lateral velocity and a vehicle turn curvature;

means for estimating a coefficient of friction between the vehicle wheels and the drive surface; and means responsive to activity of the vehicle stability enhancement system in reducing a vehicle yaw rate error for bounding the target velocity between a maximum target velocity value and a minimum target velocity value, at least one of the maximum value and the minimum value being derived from the estimated coefficient of friction.

14. The traction control of claim 13 wherein the one of the maximum target velocity value and minimum target velocity value that is derived from the estimated coefficient of friction is greater at a high magnitude of the estimated coefficient of friction than at a low magnitude of the estimated coefficient of friction.

15. The traction control of claim 13 wherein the drive wheels are front wheels of the vehicle, the traction control further comprising means for determining an understeer/oversteer behavior of the vehicle, and the means for bounding the target velocity further comprise means for deriving the maximum target velocity value from the estimated coefficient of friction when the vehicle is in understeer and deriving the minimum target velocity value from the estimated coefficient of friction when the vehicle is in oversteer.

16. The traction control of claim 15 wherein the one of the maximum target velocity value and minimum target velocity value that is derived from the estimated coefficient of friction is greater at a high magnitude of the estimated coefficient of friction than at a low magnitude of the estimated coefficient of friction.

17. The traction control of claim 13 wherein the drive wheels are rear wheels of the vehicle, the traction control further comprising means for determining an understeer/oversteer behavior of the vehicle, and the means for bounding the target velocity further comprises means for deriving the maximum target velocity value from the estimated coefficient of friction when the vehicle is in oversteer and deriving the minimum target velocity value from the estimated coefficient of friction when the vehicle is in understeer.

18. The traction control of claim 17 wherein the one of the maximum target velocity value and minimum target velocity value that is derived from the estimated coefficient of friction is greater at a high magnitude of the estimated coefficient of friction than at a low magnitude of the estimated coefficient of friction.

* * * * *